US008825780B2

(12) United States Patent
Amiel et al.

(10) Patent No.: US 8,825,780 B2
(45) Date of Patent: Sep. 2, 2014

(54) METHOD OF MANAGING AN APPLICATION EMBEDDED IN A SECURED ELECTRONIC TOKEN

(75) Inventors: Patrice Amiel, Les Milles (FR); Xavier Berard, Cadolive (FR); Frédéric Gallas, Aubagne (FR)

(73) Assignee: Gemalto SA, Meudon (FR)

( * ) Notice: Subject to any disclaimer, the term of this patent is extended or adjusted under 35 U.S.C. 154(b) by 237 days.

(21) Appl. No.: 13/382,342

(22) PCT Filed: Jun. 24, 2010

(86) PCT No.: PCT/EP2010/059034
§ 371 (c)(1),
(2), (4) Date: Jan. 5, 2012

(87) PCT Pub. No.: WO2011/003748
PCT Pub. Date: Jan. 13, 2011

(65) Prior Publication Data
US 2012/0117219 A1    May 10, 2012

(30) Foreign Application Priority Data
Jul. 9, 2009  (EP) .................................... 09305663

(51) Int. Cl.
*G06F 15/16* (2006.01)
(52) U.S. Cl.
USPC ............................ 709/206; 709/203; 709/223
(58) Field of Classification Search
USPC .......... 709/227, 229, 223, 224, 203, 206, 217
See application file for complete search history.

(56) References Cited

U.S. PATENT DOCUMENTS

| 6,481,632 | B2* | 11/2002 | Wentker et al. | 235/492 |
| 6,824,064 | B2* | 11/2004 | Guthery et al. | 235/492 |
| 7,533,265 | B2* | 5/2009 | Ballinger et al. | 713/172 |
| 8,032,872 | B2* | 10/2011 | Violleau et al. | 717/149 |
| 8,495,617 | B2* | 7/2013 | Kim et al. | 717/173 |
| 2002/0040936 | A1* | 4/2002 | Wentker et al. | 235/492 |
| 2002/0066792 | A1* | 6/2002 | Guthery et al. | 235/492 |
| 2004/0123138 | A1* | 6/2004 | Le Saint | 713/201 |

(Continued)

FOREIGN PATENT DOCUMENTS

WO    WO 2006/061754 A1    6/2006

OTHER PUBLICATIONS

International Search Report (PCT/ISA/210) issued on Oct. 5, 2010, by European Patent Office as the International Searching Authority for International Application No. PCT/EP2010/059034.

(Continued)

*Primary Examiner* — Lashonda Jacobs
(74) *Attorney, Agent, or Firm* — Buchanan Ingersoll & Rooney PC

(57) ABSTRACT

The invention is a method of managing an application embedded in a secured electronic token. The token is intended to receive a message from a server machine. The message has a header and a body. The token comprises an agent able to manage the message. The method comprises the steps of:
a) registering the application in the agent by associating a reference of the application with a value of an element of the message header,
b) when the message is received from the server machine, forwarding part of the message to the application if the message header contains an element having the value associated to the reference of the application.

15 Claims, 2 Drawing Sheets

(56) References Cited

U.S. PATENT DOCUMENTS

| | | | |
|---|---|---|---|
| 2004/0123152 A1* | 6/2004 | Le Saint | 713/201 |
| 2005/0184163 A1* | 8/2005 | de Jong | 235/492 |
| 2005/0184165 A1* | 8/2005 | de Jong | 235/492 |
| 2006/0015728 A1* | 1/2006 | Ballinger et al. | 713/172 |
| 2006/0206614 A1* | 9/2006 | Kaczmarski et al. | 709/228 |
| 2007/0131780 A1* | 6/2007 | Ho | 235/492 |
| 2009/0235352 A1* | 9/2009 | Schrijen et al. | 726/18 |
| 2009/0319781 A1* | 12/2009 | Byrum et al. | 713/156 |
| 2009/0320118 A1* | 12/2009 | Muller et al. | 726/9 |
| 2010/0146279 A1* | 6/2010 | Lu et al. | 713/172 |
| 2010/0306547 A1* | 12/2010 | Fallows et al. | 713/178 |
| 2011/0004873 A1* | 1/2011 | Park et al. | 717/174 |
| 2011/0029786 A1* | 2/2011 | Raffard et al. | 713/193 |
| 2011/0047257 A1* | 2/2011 | Lee et al. | 709/223 |
| 2011/0055573 A1* | 3/2011 | Low et al. | 713/172 |
| 2011/0092253 A1* | 4/2011 | Amiel et al. | 455/558 |
| 2011/0117961 A1* | 5/2011 | Kim et al. | 455/558 |
| 2011/0131421 A1* | 6/2011 | Jogand-Coulomb et al. | 713/189 |
| 2011/0296182 A1* | 12/2011 | Jia et al. | 713/168 |
| 2012/0246476 A1* | 9/2012 | Zhuang et al. | 713/168 |
| 2012/0311109 A1* | 12/2012 | Lee et al. | 709/220 |
| 2012/0311563 A1* | 12/2012 | Lee et al. | 717/178 |

OTHER PUBLICATIONS

Written Opinion (PCT/ISA/237) issued on Oct. 5, 2010, by European Patent Office as the International Searching Authority for International Application No. PCT/EP2010/059034.

* cited by examiner

METHOD OF MANAGING AN APPLICATION EMBEDDED IN A SECURED ELECTRONIC TOKEN

FIELD OF THE INVENTION

The present invention relates to methods of managing an application embedded in a secured electronic token. It relates particularly to methods of managing applications which are embedded in smart cards.

PRIOR ART

A secured electronic token such as a smart card may contain applications in the form of applets. These applets may be accessed by a remote server via an over the air channel, known as OTA. OTA mechanism is defined by the ETSI SCP 102.225, ETSI-SCP 102.226 and GlobalPlatform 2.2 for RAM standards. The OTA channel allows accessing data and applications which have been specifically developed for SIM cards. Only smart cards intended to be used in Telecom domain or Machine To Machine (M2M) domain are able to manage an OTA communication. In particular SIM cards offer OTA features. These smart cards may also be accessed through the HyperText Transfer Protocol, usually called HTTP. In particular, the OMA-SCWS standard versions 1.0 and later define an administration protocol for the OTA administration of the Smart Card Web Server (SCWS) resources. This protocol is based on a HTTP POST message sent by an Admin Agent application to the OTA server. The Admin Agent application is located in the smart card. As a response, the OTA server sends back a SCWS administration command in the body of the HTTP POST response. According to the standard, a fixed Content-Type is specified in the header of this HTTP POST response. At the reception of this message, and thanks to the Content-Type, the Admin Agent application forwards the body of the HTTP POST response to the SCWS for the execution of the administration commands it contains. Then, once these administrative commands have been executed by the SCWS, another HTTP POST request is sent by the Admin Agent application in order to notify the OTA server of the commands execution results. This result data is put in the body of this HTTP POST message, and a specific Content-Type is set in the header of this HTTP POST. Using a similar principle, the GlobalPlatform® 2.2 standard (Amendment B "RAM over HTTP") has defined an administration protocol for the OTA administration of the Smart Card content. This channel is well suited for the Remote Applet Management (RAM) mechanism, for the administration of Security Domains, packages and applets. The GlobalPlatform® 2.2 standard specifies a fixed pattern of Content-Type to be used in HTTP POST request messages and HTTP POST response messages.

Most of the applications developed for the SIM cards are designed with an Application Programming Interface (API) able to manage the OTA channel. These smart card applications are not able to manage the HTTP channel. It is not currently possible to target these applications because the routing of HTTP response has to be ensured by the Admin Agent that is not aware of any Content-type specific values except OMA-SCWS, RAM over HTTP and RFM over HTTP. In the three above-referenced standards, the Admin Agent application is a key component for the management of these "OTA over HTTP" protocols. Moreover, the Admin Agent application is generally part of the Operating System of smart cards. As a consequence, it is not easily possible to modify its behaviour.

There is a need for reusing the same "OTA over HTTP" protocol mechanism for purposes different from SCWS resources administration and Card content administration as defined by GlobalPlatform® or ETSI standards. In particular, there is a need for accessing any application embedded into a smart card via the HTTP mechanism. In particular a distant server must be able to communicate with an application embedded in a smart card via an HTTP session in order to personalize the application or to use a service provided by the application.

SUMMARY OF THE INVENTION

An object of the invention is to solve the above mentioned technical problem.

The object of the present invention is a method of managing an application which is embedded in a secured electronic token. The secured electronic token is intended to receive a message from a server machine. The secured electronic token comprises an agent capable of managing said message. The message has a header and a body. The method comprises the steps of:

a) registering the application in the agent by associating a reference of the application with a value of an element of the message header, b) when the message is received from the server machine, forwarding part of said message to the application if the message header contains an element having the value associated to the reference of the application.

Advantageously, when the application may generate a response to the message and the method may comprise the step of forwarding said response to the server machine.

In a preferred embodiment, the message may comply with HTTP or HTTPS format.

Advantageously, the header element may be the Content-Type as defined by the HTTP-RFC 2616 HTTP/1.1 standard.

In a preferred embodiment, the agent may deny the registering step if the application does not comply with preset security rules.

Advantageously, the agent may deny the registering step if the value of said element is already registered to another application.

The registering step may be requested by the application.

Advantageously, the secured electronic token may comprise a second application and the registering step may be requested by the second application.

Alternatively, the registering step may be requested by the server machine.

Another object of the invention is a secured electronic token intended to receive a message from a server machine. The secured electronic token comprises an agent capable of managing the message. The message has a header and a body. The secured electronic token comprises: a microprocessor, a communication interface, an operating system, a working memory and a non volatile memory. The secured electronic token is intended to comprise an application, first and second means. The first means is capable of registering the application by associating a reference of the application with a value of an element of the message header. The second means is capable of forwarding part of the message to the application if the message header contains an element which has the value associated to the reference of the application.

Advantageously, the agent may comprise a third means capable of checking if the application complies with preset security rules and capable of refusing to register the application in case of unsuccessful checking.

In a preferred embodiment, the application may generate a response to the message and the agent may comprise a fourth means capable of forwarding said response to the server machine.

Advantageously, the application may comprise a fifth means capable of requesting the agent to register the application.

In a preferred embodiment, the message may comply with HTTP or HTTPS format and the header element may be the Content-Type as defined by the HTTP-RFC 2616 HTTP/1.1 standard.

In a preferred embodiment, the secured electronic token may be a smart card.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

Figure 1:
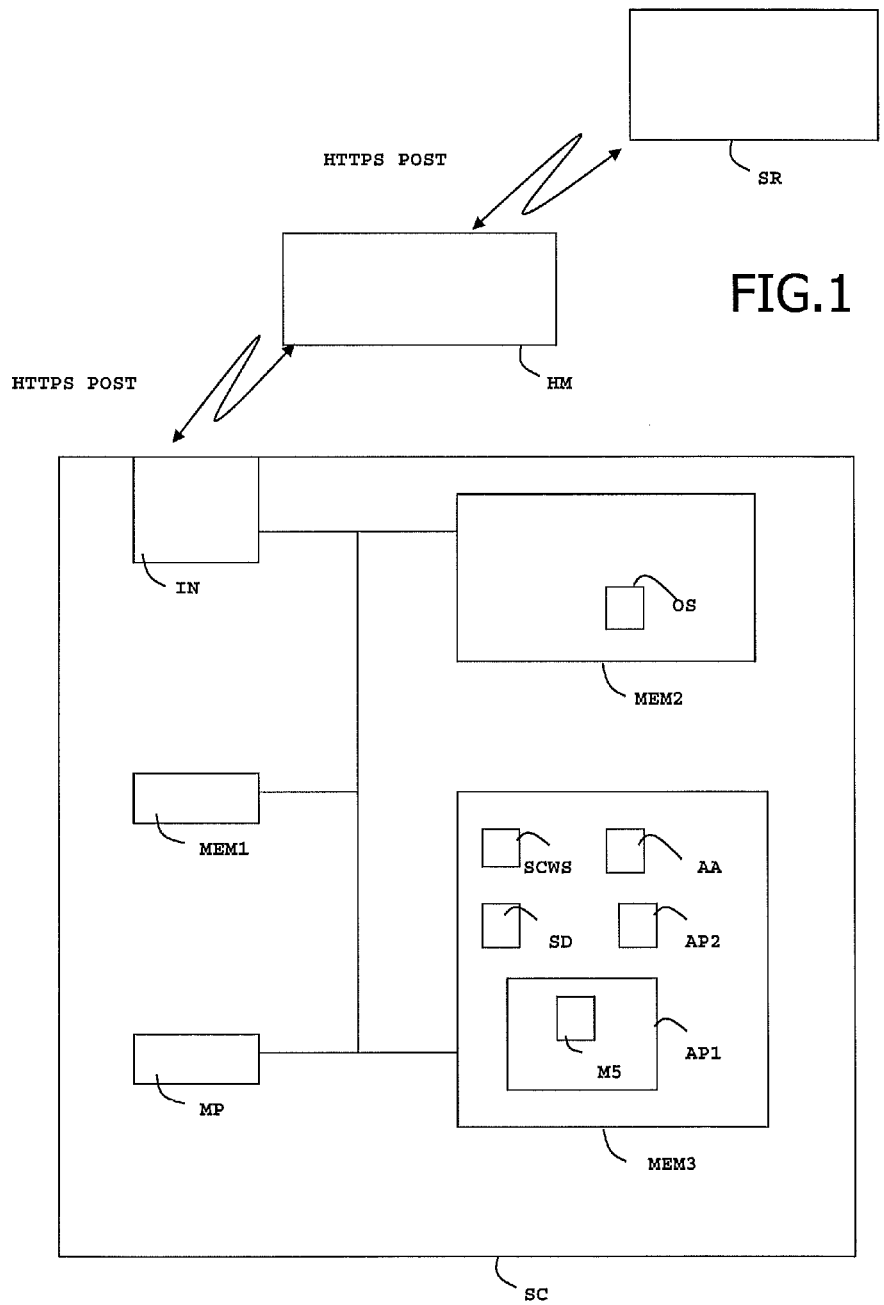
FIG. 1 depicts schematically an example of architecture of a secured electronic token which communicate with a distant server via a host machine according to the invention.

The invention may apply to any types of secured electronic token. In particular, the present invention may also apply to secure electronic token using the HyperText Transfer Protocol Secure, usually called HTTPS. In this specification, the secured electronic token is a SIM card but it could be any other kind of secured electronic device able to use the HTTP or HTTPS mechanisms. A secured electronic token may be portable and may contain one or several memories, a microprocessor and a communication interface. In this specification, the secured electronic token is connected to a host machine. In particular, the host machine may be a mobile phone or telecom terminal. The electronic token accesses the remote server through the host machine. Alternatively, HTTPS messages may be directly exchanged between the secure electronic token and the server machine without any intermediate host machine.

The present invention relies on an agent which allows the registration of an application. Both the agent and the application are stored into the secure electronic token. A distant server sends a message comprising a header and a body. The message body is intended to be received by the registered application. When registered, the application is associated to a specific value of a header field. According to the invention, the agent is an enhanced Admin Agent application. When receiving a message from the distant server the agent is able to route a part of this message to the corresponding application.

Thanks to the invention, the distant server always uses the standard HTTP mechanism and remains fully independent of interface constraints of the targeted application. The agent manages issues and data formatting for the targeted application.

An advantage of the invention is to avoid the upgrade of the used telecom terminal. Such an upgrade is heavy to manage and costly since the number of telecom terminals on the field is huge. Moreover there are many different kinds of mobile handsets already deployed.

Another advantage of the invention is to allow the embedded application to use a specific set of commands and responses. The specific set of commands and responses may comply with any format.

Another advantage of the invention is to avoid the deployment of several basic Admin Agent applications in a single token. Such a deployment of several agents is memory consuming and needs heavy validation, audits and certifications related to security issues.

Another advantage of the invention is to allow the mixing of several businesses OTA management in a unique HTTP OTA session. For example the invention allows mixing an Activation operation with an IMEI tracking operation.

Another advantage of the invention is to allow the distant server to send messages which does not contain the Applet Identifier (AID) of the targeted applet.

Another advantage of the invention is to allow the OTA access to applications which have been downloaded after the card issuing without any impact on the Admin Agent. In other words, the applications that are downloaded in post-personalization step may be reached through the OTA channel even if the Admin Agent remains unchanged.

FIG. 1 shows the architecture of a secure electronic token SC of SIM card type according to a preferred embodiment of the invention.

The secure electronic token SC comprises a working memory MEM1 of RAM type, two non volatile memories MEM2 and MEM3, a microprocessor MP and a communication interface IN. The non volatile memory MEM2 comprises an operating system OS which may contain a Java Virtual Machine.

The non volatile memory MEM3 comprises two applets AP1 and AP2, a smart card web server SCWS, a security domain SD and an agent AA. The security domain SD complies with the GlobalPlatform standard.

The two memories MEM2 and MEM3 may be implemented as any combinations of one, two or more memories. These memories may be NAND flash or EEPROM memory or another type of non volatile memory.

The SIM card SC is intended to exchange messages with a telecom handset HM through the communication interface IN. The telecom handset HM is intended to exchange messages with a distant server SR via the OTA mechanism. Thus the SIM card SC may exchange messages distant server SR through the connected host machine HM.

The agent AA may be implemented as an applet in a Java Card. In this example the two applications AP1 and AP2 depend on the security domain SD. The applet AP1 comprises a means M5 which is capable of requesting the agent AA to register the applet AP1.

In a preferred embodiment, the agent AA may be merged with the Security Domain SD.

Figure 2:
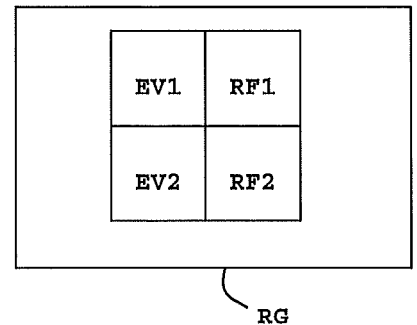
FIG. 2 is an example of a first embodiment of a register embedded in the agent according to the invention.

FIG. 2 shows an example of a first embodiment of a register RG embedded in the agent AA according to the invention.

The register RG is intended to contain a set a couples {element value, reference of an application}. In the example of the FIG. 2, the register RG contains two couples: {EV1, RF1} and {EV2, RF2}.

RF1 is a reference of the applet AP1 and RF2 is a reference of the applet AP2. For example RF1 may be equal to the AID of the applet AP1 or an address specific to AP1 or to an identifier stored in a dedicated registry.

EV1 is a value associated to the applet AP1 and EV2 is a value associated to the applet AP2. In this first embodiment, the values EV1 and EV2 are supposed to be the possible values for an implicit preset field of the HTTP message header. In particular, the two values EV1, EV2 may be intended to be found in the Content-Type field of the HTTP header. For example EV1 may be equal to "application/ImeiTracking/1.0" and EV2 may be equal to "application/PDM/1.0". In this example, EV2 may correspond to a phonebook application wherein PDM stands for Personal Data Manager.

Figure 3:
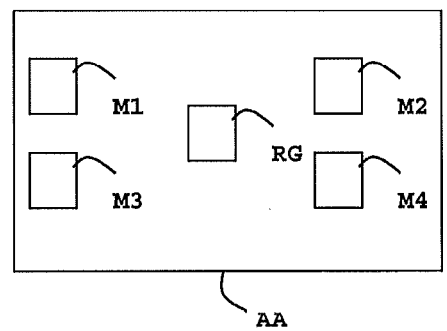
FIG. 3 is an example of agent architecture according to the invention.

FIG. 3 shows an example of architecture of the agent AA. The agent comprises a register RG and four means M1, M2, M3 and M4.

The means M1 is able to register the applet AP1. The registration is carried out by associating a reference RF1 of the application AP1 with a value of an element of the HTTP message header. The reference used in the register RG allows the agent AA to identify the targeted application to be triggered.

When a HTTP message is received from the server SR, the means M2 is able to forward part of a HTTP message to the applet AP1 if the HTTP message header contains an element equal to the value EV1 associated to the reference RF1. Similarly, the means M2 is able to forward part of the received HTTP message to the applet AP2 if the HTTP message header contains an element equal to the value EV2 associated to the reference RF2. Generally, the part of the HTTP message which is forwarded to the targeted applet is the entire body of the HTTP message sent by the server SR.

The means M3 is able to check if the applet AP1 complies with preset security rules. The means M3 refuses to register an applet if the security checking is unsuccessful. For example the means M3 may check that the applet AP1 is in the same security domain as the agent AA.

In most cases, the applet AP1 generates a response to the data received from agent AA. The means M4 is able to forward the response to the distant server SR. The sending of the response is done thanks to a HTTP message containing the response.

Figure 4:
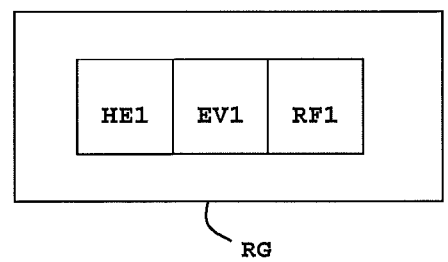
FIG. 4 is an example of a second embodiment of a register embedded in the agent according to the invention.

FIG. 4 shows an example of a second embodiment of a register RG embedded in the agent AA according to the invention. The register RG is intended to contain a set a subsets {Identifier of header element, element value and reference of an application}. In the example of the FIG. 4, the register RG contains one subset: {HE1, EV1, RF1}. RF1 is a reference of the applet AP1 and EV1 is a value associated to the applet AP1. HE1 is an identifier of a field of the HTTP message header. For example, the identifier HE1 may point at the Content-Type field. For instance HE1 may be equal to "ContentType" when the identifier HE1 corresponds to the Content-Type field. Alternatively, the HTTP message may contain another header defined with a customized field. For example HE1 may be equal to "X-Admin-To" if the identifier HE1 corresponds to an additional customized header of the HTTP message.

According to an embodiment of the invention, the first step of the method corresponds to the registration of the applet AP1 into the agent AA. For example, the registration may be requested by the applet AP1 itself. The applet is registered into the agent AA by storing a couple comprising a value EV1 of an element of HTTP message header and a reference RF1 of the applet AP1. In a preferred embodiment, the element of the HTTP message header is the Content-Type. The value EV1 must be chosen so as to be different from the patterns defined by the OMA-SCWS and GlobalPlatform® 2.2 standards.

The application AP1 may generate a request for initializing an OTA session. Then the application AP1 sends this request to the agent AA.

Then the agent AA sends a first HTTP POST message to the remote server SR through the connected host machine HM.

Then the remote server SR sends a HTTP response request message to the token SC. The header of this HTTP response message contains a Content-Type field equal to EV1. The HTTP response message is received by the agent AA in the token SC. The agent AA checks if an applet has been registered for the EV1 value. Since the applet AP1 has been registered and associated to EV1 value for the Content-Type field, the agent AA extracts the body of the received HTTP response message. For example, the body may contain an applicative command aiming at updating the phonebook. The body may also contain an applicative message based on the TLV structure or based on any other relevant format. Then the agent AA sends the extracted data to the applet AP1. In a preferred embodiment, RF1 is equal to the AID of the applet AP1. Thus the agent AA is able to easily find the targeted application. Then the applet AP1 treats the received data and computes a response corresponding to the received applicative command. The applet AP1 sends the response to the agent AA. Then the agent AA generates a HHTP POST message which contains the applet response and sends the HHTP POST message to the server SR. The applet AP1 provides the agent AA with the URL of the server SR. The HTTP POST message is generated with a header whose Content-type field is set to EV1 and with a body comprising the response provided by the applet AP1. Thus the server SR receives a HTTP POST message corresponding to the initial HTTP response message.

In a preferred embodiment both the server SR and the agent AA have credentials allowing to secure the HTTP communication through HTTPS.

Alternatively, the register RG may contain a subset {HE1, EV1, RF1} as described at FIG. 4. In particular, the identifier HE1 may correspond to the Content-type field of the HTTP header. In this case, the agent AA checks if an applet has been registered for the EV1 value in the header field HE1.

Thanks to the invention, a remote HTTP server may send a full OTA script to an application embedded in a secure electronic token. In particular, a remote HTTP server may send full OTA scripts to an application which is different from a Smart Card Web Server.

Advantageously, any attempt of an applet to register to an element value which is already registered to another applet is denied.

Alternatively, the agent AA is able to manage the possible conflicts when selecting the targeted application thanks to register RG. The main rule is to select one application at the most. Either no application is selected or only one application is selected according to a dedicated preset policy. For example the agent AA may select the first application matching an entry in the register RG.

In one embodiment, only self registration may be authorized. In other words an applet may request the registration for itself only.

Alternatively, the registration may be delegated to another application embedded into the secure token SC. Thus the registration of an applet by another applet may be authorized. In this case, the registered target applet shall anyway already exist in the token SC.

In another embodiment, the agent AA may also allows the remote registration of an applet. Thus the distant server SR may ask for the registration of the applet AP1. The agent AA may provide an OTA command dedicated to the remote registration for example. Thus a distant server may load, install and register a new applet in a secure token.

Advantageously, the agent AA may provide a feature allowing requesting the deletion of the applet entry in the register RG. This feature may be implemented thanks to a Java Card or an OTA entry point.

An advantage of the invention is to allow a dynamic management of the HTTPS channels between a distant server and an application embedded in a secure token. Thanks to the registration mechanism, the link between the application and the remote server may be set and removed according to applicative and administrative needs.

The invention claimed is:

1. A method of managing an application embedded in a secured electronic token, said secured electronic token being configured to receive a message from a server machine, said secured electronic token comprising an agent configured to manage said message, the message having a header and a body, wherein said method comprises the steps of:
   a) registering the application in the agent by associating a reference of the application with a value of an element of the message header,
   b) when the message is received from the server machine, forwarding part of said message from the agent to the application if the message header contains an element having the value associated to the reference of the application, said forwarded part of the message containing a command to be executed by the application.

2. A method according to claim 1, wherein said method comprises the further step of:
   c) when the application generates a response to the message, forwarding said response to the server machine.

3. A method according to claim 1, wherein said message complies with HTTP or HTTPS format.

4. A method according to claim 3, wherein said header element is the Content-Type as defined by the HTTP-RFC 2616 HTTP/1.1 standard.

5. A method according to claim 1, wherein said agent denies said registering step if the application does not comply with preset security rules.

6. A method according to claim 1, wherein said agent denies the registering step if the value of said element is already registered to another application.

7. A method according to claim 1, wherein said registering step is requested by the application.

8. A method according to claim 1, wherein said secured electronic token comprises a second application and wherein said registering step is requested by the second application.

9. A method according to claim 1, wherein said registering step is requested by the server machine.

10. A secured electronic token configured to receive a message from a server machine, said secured electronic token comprising an agent configured to manage said message, the message having a header and a body, said secured electronic token comprising:
    a microprocessor,
    a communication interface,
    an operating system,
    a working memory and a non-volatile memory,
    said secured electronic token being configured to implement an application,
    wherein said agent comprises first and second means, said first means being configured to register the application by associating a reference of the application with a value of an element of the message header and said second means being configured to forward part of said message to the application if the message header contains an element having the value associated to the reference of the application, said forwarded part of the message containing a command to be executed by the application.

11. A secured electronic token according to claim 10, wherein said agent comprises a third means configured to check if the application complies with preset security rules and configured to refuse to register said application in case of unsuccessful checking.

12. A secured electronic token according to claim 10, wherein the application generates a response to the message, and wherein said agent comprises a fourth means configured to forward said response to the server machine.

13. A secured electronic token according to claim 10, wherein the application comprises a fifth means configured to request the agent to register the application.

14. A secured electronic token according to claim 10, wherein said message complies with HTTP or HTTPS format and wherein said header element is the Content-Type as defined by the HTTP-RFC 2616 HTTP/1.1 standard.

15. A secured electronic token according to claim 10, wherein said secured electronic token is a smart card.

* * * * *